United States Patent [19]

Horny et al.

[11] Patent Number: 4,993,996
[45] Date of Patent: Feb. 19, 1991

[54] CHAIN MAGAZINE FOR SHOP MACHINES

[75] Inventors: Walter Horny; Helmut Krug, both of Nürtingen, Fed. Rep. of Germany

[73] Assignee: Gebr. Heller Maschinenfabrik GmbH, Nürtingen, Fed. Rep. of Germany

[21] Appl. No.: 483,888

[22] Filed: Feb. 23, 1990

[30] Foreign Application Priority Data

Feb. 24, 1989 [DE] Fed. Rep. of Germany ....... 3905780

[51] Int. Cl.⁵ ............................................. F16H 55/00
[52] U.S. Cl. ............................. 474/155; 198/463.2; 474/163
[58] Field of Search ................ 474/152, 153, 155–157, 474/162, 163, 165, 150, 151, 206; 198/463.1, 463.2, 466.1, 469.1, 470.1, 678.1, 804, 844.1

[56] References Cited

U.S. PATENT DOCUMENTS

| | | | |
|---|---|---|---|
| 3,205,022 | 9/1965 | Greifendorff et al. | 474/163 X |
| 3,655,026 | 4/1972 | Hirn | 198/463.2 |
| 3,858,454 | 1/1975 | Duff | 474/163 X |
| 4,433,777 | 2/1984 | Densmore | 474/155 X |
| 4,609,365 | 9/1986 | Eberle | 474/155 X |

Primary Examiner—Thuy M. Bui
Attorney, Agent, or Firm—Robert W. Becker & Associates

[57] ABSTRACT

A chain magazine for shop machines, especially for apparatus for handling workpieces, including at least one endless rotating chain, preferably a roller chain, that is guided over sprocket wheels. Holders, for accommodating tools, workpieces, or the like, are mounted on the chains via connectors that are provided on at least two places of attachment, preferably pins, of chain links of the chains. Each connector, in a portion thereof that is disposed beyond the sprocket wheels, is provided with at least one support part via which the connector is supported against at least an adjacent chain link of the chains.

12 Claims, 3 Drawing Sheets

CHAIN MAGAZINE FOR SHOP MACHINES

BACKGROUND OF THE INVENTION

The present invention relates to a chain magazine for shop machines, especially for apparatus for handling workpieces, and includes at least one endless rotating chain, preferably a roller chain, that is guided over sprocket wheels, with holders, for accommodating tools, workpieces, or the like, being mounted on the chain via connectors that are provided on at least two places of attachment, preferably pins, of chain links of the chains.

Via such chain magazines, the tools, workpieces, or the like that are accommodated in the holders are brought into the zone of a changer that removes the tools, etc., from the holders and places them into the shop machine. So that the changer can reliably remove the tool, workpiece, or the like from the holder, it is necessary that in the grasping position the tools etc. assume a precise position relative to the changer. Since the holders must accommodate tools, workpieces or the like that have different weights, holders that are thus equipped have correspondingly different weights. For this reason, in the changing position the holders tilt to different extents, so that depending upon the holder, different changing positions are provided. This tilting movement is possible because the transport chain is flexible and has a certain amount of play in its guide means. If the holders are equipped with very heavy tools, workpieces, or the like, these holders then assume the deepest position in the changing position, whereas empty holders, as a consequence of their light weight, assume the highest position in the changing position. Due to these varying positions of the holders in the changing position, problems arise during the changing process.

It is therefore an object of the present invention to embody a chain magazine of the aforementioned general type in such a way that the tools, workpieces, or the like that are accommodated in the holder assume as exact a position as possible in the grasping position.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The chain magazine of the present invention is characterized primarily in that each connector, in a portion thereof that is disposed beyond the sprocket wheels, is provided with at least one support part via which the connector is supported against at least an adjacent chain link of the chain.

With the inventive chain magazine, the connector is supported via the support part on the chain in such a way that no, or at most only a very slight, position deviation occurs in the grasping position of the changer. As a result, the changer can reliably grasp the respective tool, workpiece, or the like and can remove the same from the holder. With the inventive connector, no specially constructed chain is required. Rather, it is possible to use conventional DIN chains, sprocket wheels, and chain guides. The inventive chain magazine can consequently be manufactured in an extremely economical manner.

Further specific features of the present invention will be described in detail subsequently.

DESCRIPTION OF PREFERRED EMBODIMENTS

Figure 1:
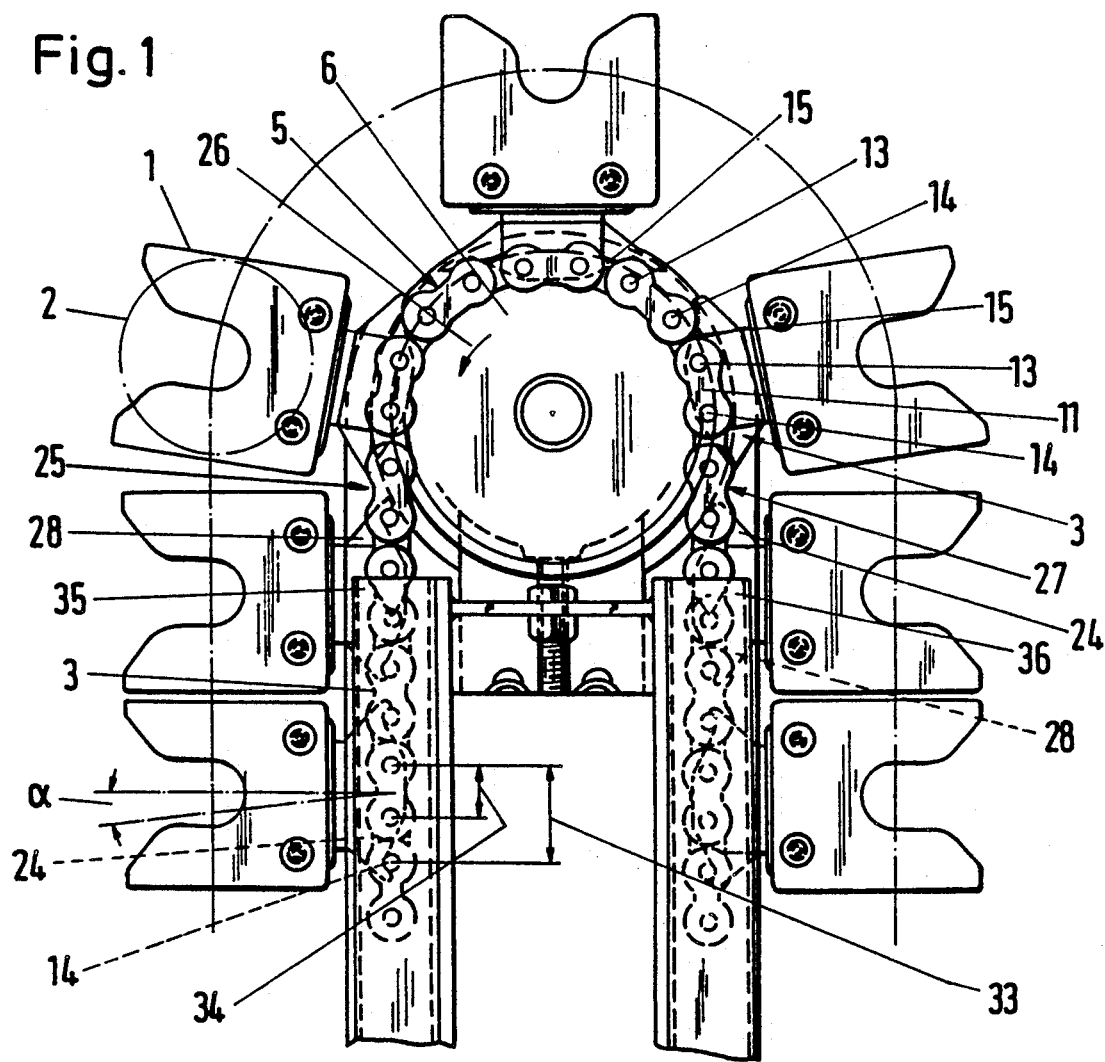
FIG. 1 shows a portion of one exemplary embodiment of the inventive chain magazine, which is provided with connectors in order to connect holders for tools and/or workpieces with endless chains.

Referring now to the drawings in detail, as shown in FIG. 1 the chain magazine for shop machines, especially for apparatus for handling workpieces, is provided with holders 1 for tools and/or workpieces 2. By means of connectors 3, the holders 1 are secured on chain belts or endless chains 4, 5, which are preferably roller chains. The chains 4, 5 are guided over sprocket wheels 6 and 7. In conformity with the cycle that has been introduced, the chain magazine is moved in such a way that the desired tool 2 is disposed at a prescribed position at which the tool can be removed from the holder 1 via a tool changer and can be inserted into the spindle of the shop machine in question.

The holders 1 are basically known and will for this reason not be described in greater detail. As can be seen more clearly from FIG. 2, the holders have receiving means 8 for a conical portion 9 of the tool or workpiece 2.

Figure 2:
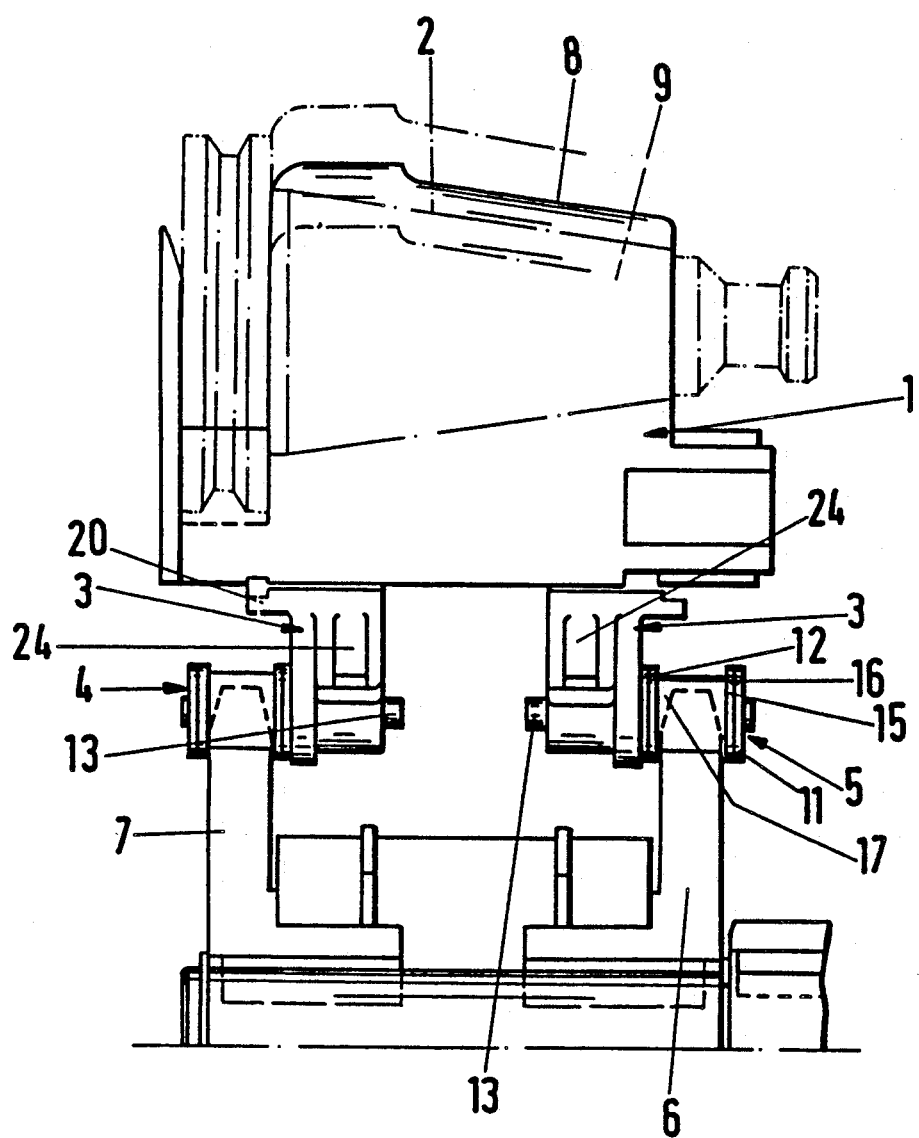
FIG. 2 is an enlarged view of a portion of two sprocket wheels over which the roller chains of FIG. 1 are guided.

In the illustrated embodiment, as shown in particular in FIG. 2, each holder 1 is secured via two connectors 3 to the endless chains 4 and 5 respectively. These endless chains are of the same construction, each being embodied as a twin roller chain pursuant to DIN 8187/ISO R 606; each of the endless chains 4, 5 has two opposed outer link members 11, 12 that are interconnected by two pins 13, 14. Outer link members 11, 12 that are adjacent to one another in the longitudinal direction of the chain are pivotably interconnected by respective inner link members 15 and 16 that are also provided in pairs. The inner link members 15, 16 that in the longitudinal direction of the chain connect adjacent outer link members 11, 12 are similarly pivotably connected with the outer link members 11, 12 via the adjacent pins 13 and 14. Disposed in a known manner on the pins 13, 14 in the region between the inner link members 15, 16 are respective rollers 17. The sprocket wheels 6, 7 mesh in a known manner between adjacent rollers of the endless chains 4 and 5.

As shown in FIG. 2, the pins 13, 14 of the two parallel endless chains 4, 5 are lengthened or extended toward one another beyond the chains. Loosely seated on the pins 13, 14 are the connectors 3, which are provided with appropriate holes 18 and 19 (see FIG. 3). As shown in FIG. 2, the pins 13, 14 extend beyond the connectors 3 in a direction toward one another. Each holder 1 is held on the endless chains 4 and 5 by two connectors 3. In the illustrated embodiment, the connectors 3 are separate from the holder 1 and are detachably connected therewith. This enables an easy assembly of the holders because first the connectors 3 can be successively placed upon the projecting pins 13 and 14, the spacing of which from one another is greater than the length of the connectors 3. Subsequently, the holder 1 can be placed upon the two connectors 3 and secured thereto.

The connectors 3 are placed upon the pins 13 and 14 in such a way that they are disposed at the level of the outer link members 13, 14 of the endless chains 4, 5 (see FIG. 2). In order to be able to reliably secure the holder 1 to the two connectors 3, that side of the connectors that face the holder 1 is provided with a plate-shaped widened portion 20 against which the holder 1 rests. When viewed in the direction of the illustration of FIG. 3, the connector 3 has a rectangular main body 21 in which the two holes 18 and 19 are provided. Two threaded sleeves 22 and 23 are placed into the main body 21 on that side that is provided with the widened portion 20; the screws for connecting the holder 1 are screwed into the sleeves 22, 23.

Due to the play of the chain guides, and due to the flexibility of the endless chains 4, 5, which manifests itself in particular when the holders 1 are subjected to different loads, the holders 1, in the horizontal position illustrated in FIG. 1 in which the chain strands extend vertically, are inclined slightly downwardly, so that a position deviation of the tool or workpiece 2 from the desired position by an angle $\alpha$ occurs. Depending upon the weight of the holder 1 and/or of the play of the chain links, different position deviations $\alpha$ result. In order to keep the position deviation $\alpha$ as small as possible, and advantageously to even completely eliminate the same, the connector 3 is provided with a support part 24 via which the holder 1, in the tool or workpiece changing position, is supported against the endless chains 4, 5 in such a way that no position deviation $\alpha$ occurs. The support part 24 is embodied in such a way that it is supported on the pin 14 of the adjacent chain link (see FIG. 1).

If the holder 1 is disposed in the left strand 25 in FIG. 1, and the sprocket wheels 6, 7 turn in the direction of the arrow 26, the support part 24 is then supported against the pin 13 of the leading chain link as viewed in the direction of rotation of the chains 4, 5. On the opposite side of the main body 21, the connector 3 is provided with a further support part 28 that in the other strand 27 of the endless chains 4, 5 is supported on the pin 13 of the trailing chain link as viewed in the direction of rotation of the endless chains 4, 5 (see FIG. 1).

Figure 3:
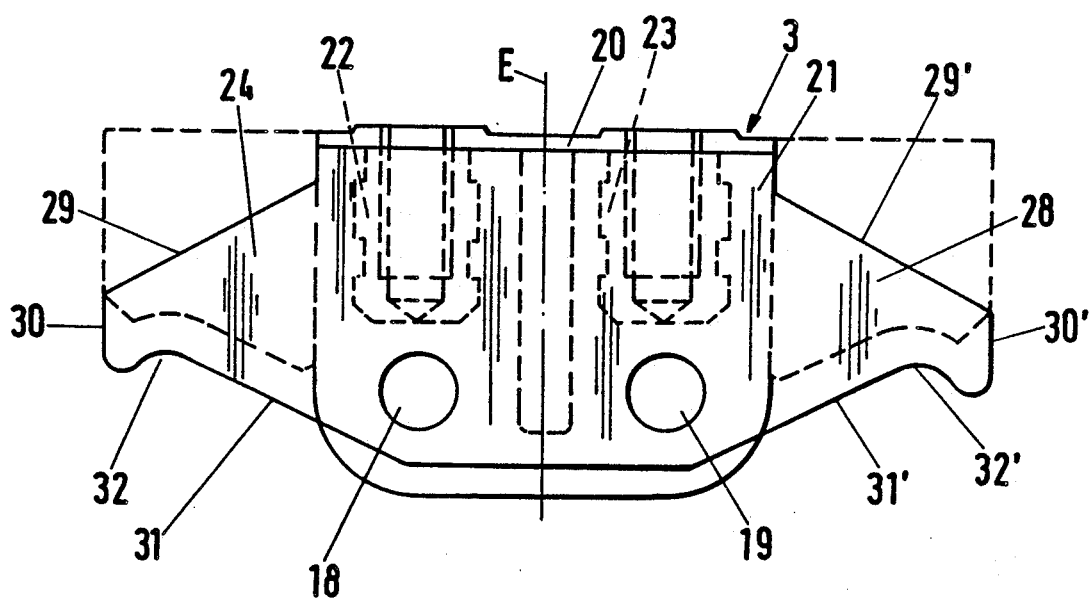
FIG. 3 is an enlarged side view of one exemplary embodiment of an inventive connector.

The support parts 24, 28 are provided on the oppositely disposed narrow sides of the main body 21, and are embodied in a mirror symmetrical manner relative to the transverse central plane of the connector (see FIG. 3). As a consequence of this symmetrical arrangement, the same connector 3 can be alternatively used for connection to the chain 4 or the chain 5. As can be seen from FIG. 2, the main body 21 and the support parts 24, 25 are disposed in the region adjacent the chain links of the endless chains 4, 5, so that these support parts cannot come into contact with the chain links and the sprocket wheels 6, 7. Adjoining the oppositely disposed sides of the main body 21 at a slight distance from the widened portion 20 are inclined top surfaces 29, 29' of the support parts 24 and 28 respectively (see FIG. 3). These inclined surfaces extend at an angle to one another and merge via an obtuse angle into relatively short end faces 30, 30' that extend parallel to one another. Oppositely disposed from the top surfaces 29, 29', the support parts 24, 28 are provided with undersides 31, 31' that converge from the pertaining top surfaces, so that the support parts 24, 28 preferably continuously widen from the end faces 30, 30' in a direction toward the main body 21. In the vicinity of the end faces 30, 31 the support parts 24, 28 are provided on the undersides 31, 31' with a partially circular recess 32, 32' into which the respective pins 13 or 14 of the pertaining chain link engage in the support position (see FIG. 1). The radius of curvature of the recess 32, 32' preferably corresponds to the radius of the pins 13, 14, so that in the support position the support part 24, 28 rests over a large surface against the respective pin. As shown in FIG. 1 the length of the two support parts 24 and 28 of the connector 3 is such that in the support position the connector 3 rests not only against the pin 14 of the leading chain link but also against the pin 13 of the trailing chain link. The holder 1 is optimally supported in this way. If the holder 1 assumes the horizontal left or right position in FIG. 1, it is then supported via the appropriate support part against the adjacent chain link, so that the aforementioned position deviation $\alpha$ does not occur at all or at most occurs to only a slight extent. As a result, the tool or workpiece 2 that is disposed in the holder 1 assumes a position that is optimum for being grasped. Since the support parts 24 and 28 each widen from the end faces 30, 30' in a direction toward the main body 21, they are able to carry an adequate load. As shown in FIG. 1, the support length 33, as measured between the pin 14 of the leading chain link and the bolt 14 that is the furthest therefrom in that chain link on which the connector 3 is held, is greater than the chain pitch 34.

The length of the support parts 24, 28 can also be such that they are also supported against the next chain link plus one. However, this presupposes that two chain links are provided between successive holders 1. In the illustrated embodiment, only one chain link is disposed between adjacent holders 1.

As the endless chains 4, 5 are guided about the sprocket wheels 6, 7, the support parts 24, 28 are raised from the pins 13, 14 of the corresponding chain links (upper position of the holder 1 in FIG. 1). As soon as the endless chains 4, 5 have been guided about the sprocket wheels, the support parts 24, 28 are again supported against the pins of the corresponding chain links. This support is effective in any desired chain installation position.

As shown in FIG. 1, beyond the sprocket wheels 6, 7 the chains 4, 5 are guided in a known manner in guide rails 35 and 36, which end at a slight distance from the respective sprocket wheel 6, 7. As a consequence of the support parts 24, 28, the length of the connectors 3 in the longitudinal direction of the chain is such that these connectors bridge the distance between the end or beginning of the guide rails 35, 36 and the sprocket wheels 6, 7. This has the advantage that the transition of the chains 4, 5 from the sprocket wheels 6, 7 to the rails 35, 36 is spanned by the connectors 3. This results in a very quiet running of the chain, since as a consequence of the spanning or bridging, the oscillation or buckling of the chain in the critical region between the sprocket wheel and the guide rail is considerably reduced.

The connector 3 is advantageously made of plastic, although it can also be made of any suitable material. With an appropriate choice of material for the connector 3, especially if is made of plastic, the running noise can be further reduced by favorable damping characteristics. Since as a result of the described configuration of the holder 1 with the connectors 3 conventional DIN chains, chain sprockets, and chain guides can be used, the chain magazine can be produced in a very economical manner.

In the embodiment that is illustrated and described, the endless chains 4, 5 extend vertically; these chains could also extend at an angle to the horizontal. Also with such a position the aforementioned position deviation α occurs, which is counteracted by the use of the connectors 3 in the manner described.

A further important advantage of the inventive connectors 3 is that as the endless chains 4, 5 rotate, a support of adjacent chain links against one another is effected via the connectors 3. This results in a very quiet running of the endless chains, which in turn has a positive effect upon the operational precision of the machine, because the vibrations that occur with the heretofore known chain magazines during running of the endless chains is thereby avoided, or at least is considerably reduced.

In the illustrated embodiment, the connectors 3 are separate parts from the holder 1. However, the connectors could also be integrally formed with the holders 1. In addition, it is not absolutely necessary to have two connectors 3 for the holder; depending upon the structural configuration, the holders 1 could also be connected to the corresponding chain or chains with only one connector 3 or with more than two connectors.

A further exemplary embodiment of the inventive connector is illustrated by dashed lines in FIG. 3. In this embodiment, the main body 21 is enlarged, resulting in a greater support surface for the holder 1. In such a case, the threaded sleeves 22 and 23 would be provided in the enlarged end region of the connectors 3. In other respects, this embodiment of the inventive connector fulfills the same function as does the connector that is illustrated by solid lines in FIG. 3.

The present invention is, of course, in no way restricted to the specific disclosure of the specification and drawings, but also encompasses any modifications within the scope of the appended claims.

What we claim is:

1. In a chain magazine for shop machines, especially for apparatus for handling workpieces, including at least one endless rotating chain, preferably a roller chain, that is guided over sprocket wheels, with holders, for accommodating tools, workpieces, or the like, being mounted on said chain via connectors that are provided on at least two places of attachment, preferably pins, of chain links of said chain, the improvement wherein: each of said connectors, in a portion thereof that is disposed beyond said sprocket wheels, is provided with at least one support part via which said connector is supported against at least an adjacent chain link of said chain.

2. A chain magazine according to claim 1, in which each of said connectors has two oppositely disposed sides that face in and counter to the direction of rotation of said chain, with each of said oppositely disposed sides being provided with one of said support parts, which are supported on respective leading and trailing chain links that in said direction of rotation of said chain are at least adjacent.

3. A chain magazine according to claim 2, in which, as said places of attachment, extended pins are provided via which said chain links are interconnected and on which said holders are seated via said connectors, with each of said support parts being supported on one of said pins of at least an adjacent chain link.

4. A chain magazine according to claim 3, in which said connector includes a main body from which each support part extends, towards a free end thereof, in such a way that the width of said support part decreases.

5. A chain magazine according to claim 4, in which said width of said support part decreases essentially uniformly.

6. A chain magazine according to claim 3, in which said support part has a side that faces a pertaining chain link and is provided with receiving means.

7. A chain magazine according to claim 6, in which said receiving means is a recess.

8. A chain magazine according to claim 6, in which said receiving means is curved in the manner of a partial circle 9. A chain magazine according to claim 8, in which said radius of curvature of said receiving means corresponds to the radius of said pins of said chain.

10. A chain magazine according to claim 1, which includes a guide means for said chain that is spaced from said sprocket wheels, with each of said connectors being longer than the distance between said guide means and a point of support of said chain on said sprocket wheels.

11. A chain magazine according to claim 1, in which said connectors are made of plastic.

12. A chain magazine according to claim 1, in which said connectors are integral with pertaining holders.

* * * * *